Patented Dec. 11, 1923.

1,477,153

UNITED STATES PATENT OFFICE.

LORE A. ROGERS, OF WASHINGTON, DISTRICT OF COLUMBIA, ASSIGNOR TO ASSISTANT SECRETARY OF AGRICULTURE OF THE UNITED STATES OF AMERICA.

PROCESS OF MAKING A FOOD PRODUCT FROM SKIM MILK.

No Drawing.   Application filed February 24, 1923.   Serial No. 621,061.

(FILED UNDER THE ACT OF MARCH 3, 1883, 22 STAT. L., 625.)

*To all whom it may concern:*

Be it known that I, LORE A. ROGERS, a citizen of the United States of America, and an employee of the United States Department of Agriculture, residing at Washington, D. C. (whose post-office address is care of United States Department of Agriculture, Washington, D. C.), have invented a new and useful Process of Making a Food Product from Skim Milk.

This application is made under the act of March 3, 1883, chapter 143 (22 Stat., 625) and the invention herein described and claimed may be used by the Government of the United States or any of its officers or employees in the prosecution of work for the Government, or by any person in the United States, without payment to me of any royalty thereon.

The concentration of buttermilk is now a well established commercial enterprise. This is usually accomplished by evaporating a part of the water in a vacuum pan. If the concentration is carried to a point at which the finished product is a semi-fluid, pasty mass it is known as concentrated buttermilk, and is used extensively as poultry feed.

In making semi-solid concentrated buttermilk from buttermilk obtained by churning sour cream the casein is already precipitated and the precipitated curd broken up into small particles which have very little tendency to conglomerate when the buttermilk is heated in the pan. Consequently when buttermilk is condensed the finished product is made of very small separate particles and has a homogeneous, smooth appearance. On the other hand, if skim milk which has the same chemical composition as buttermilk is soured by the addition of acid, or the growth of acid-forming bacteria, and is subjected to the condensing process the precipitated curd is conglomerated and the finished product consists of tough lumps of curd and whey. The semisolid concentrated buttermilk is preserved by the acid which, in the finished product, is quite concentrated. It is necessary that this acidity should be sufficiently high to prevent the growth of bacteria. The ordinary lactic acid bacteria do not always produce sufficient acid in the skim milk to give the required concentration in the finished product. I find that by using bacteria of the so-called Lactobacillus type a much higher acidity can be obtained, and the finished product has a better keeping quality.

I find that when the curd after precipitation is thoroughly broken up mechanically, the precipitated, sour skim milk may be condensed in a vacuum pan without conglomeration of the curd and a satisfactory product obtained. This is accomplished by agitation or more satisfactorily by forcing the precipitated milk through an emulser or homogenizer. In this process the milk is forced by high pressure through a small orifice so that the curd particles are thoroughly broken up.

By this method the curd particles of the soured milk acquire the same physical condition as the particles of curd in churned buttermilk. This process is also useful in making buttermilk powder, which is simply a continuation of the process of evaporation, although a different type of machinery is necessary for removing the water after a certain concentration is reached.

I claim:

1. The process of making a food product consisting in precipitating the casein of skim milk by the growth of high acid producing bacteria of the Lactobacillus group, breaking the curd into fine discrete particles by forcing the soured skim milk through a homogenizer, and condensing the skim milk.

2. The process of making a food product by precipitating the casein of skim milk by the development of acid through the fermentation of the milk sugar by bacteria, breaking the precipitated curd into fine discrete particles by mechanical means, and reducing to a powder.

LORE A. ROGERS.